Feb. 18, 1941.     O. W. HOSKING     2,232,530
RUBBER VALVE STEM
Filed Oct. 27, 1936

INVENTOR.
BY OAKLEY W. HOSKING
Kwis, Hudson & Kent
ATTORNEYS.

Patented Feb. 18, 1941

2,232,530

UNITED STATES PATENT OFFICE 2,232,530

RUBBER VALVE STEM

Oakley W. Hosking, Monroe, N. Y., assignor to Dill Manufacturing Company, Cleveland, Ohio, a corporation of Ohio Application October 27, 1936, Serial No. 107,832

11 Claims. (Cl. 251—158)

This invention relates to a valve stem for inflatable articles, as for example pneumatic tire tubes, and particularly to a valve stem formed of molded rubber and having arranged therein a metal valve receiving insert or sleeve.

An object of the invention is to provide a rubber valve stem which is so constructed that the metal valve receiving insert or sleeve is mechanically, firmly and permanently secured therein in air sealing relationship and without reliance upon adherence between the stem and insert, such as is secured by vulcanization and the like.

Another object is to provide a rubber valve stem of such construction that the danger of the metal valve receiving insert blowing out of the stem under air pressures is obviated.

Another object is to provide a rubber valve stem which is so constructed that various forms of valves may be employed therein, as for example any conventional form of valve insides or core may be used therein, or a valve which seats against an integral part of the stem acting as a valve seat may be used therein.

Another object is to provide a metal valve receiving insert or sleeve for a rubber valve stem construction which can be readily varied in length for valve stems of different length.

Further and additional objects and advantages not hereinbefore specifically referred to will become apparent hereinafter during the following detailed description when taken in connection with the accompanying drawing, wherein Fig. 1 is a longitudinal sectional view through a valve stem embodying the invention and on an enlarged scale, a conventional form of valve insides or core being shown as arranged in the metal valve receiving insert or sleeve.

Figure 1:
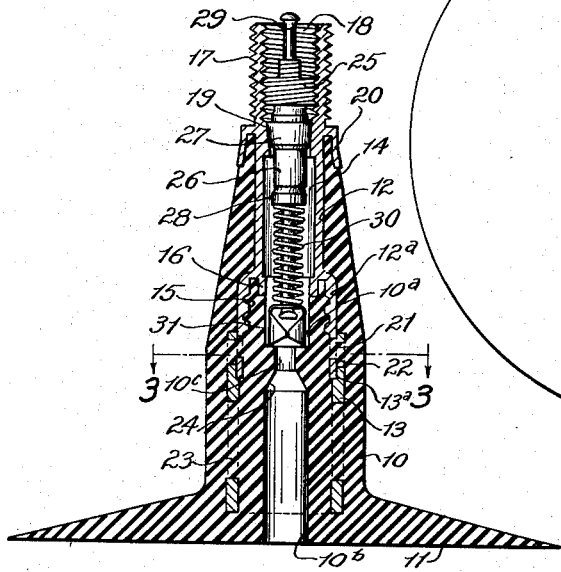
Figure 3:
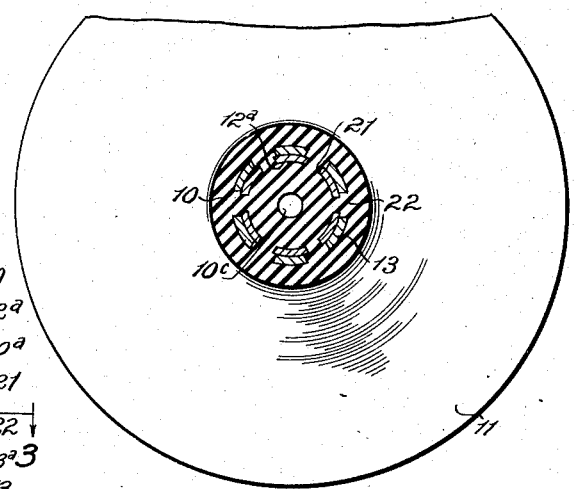
Fig. 3 is a sectional view taken substantially on line 3—3 of Fig. 1 looking in the direction of the arrows.

A valve stem embodying the present invention is formed of molded rubber and comprises a stem portion 10 and a base portion 11 which is vulcanized to the inflatable article to which the stem is applied. A metal valve receiving insert or sleeve is molded in the stem and comprises two separable members 12 and 13. When the valve stem is a short stem, only the member 12 need be employed as the insert or sleeve in the stem, but when the valve stem is a long stem, the member 13 is telescoped upon the enlarged end 12a of the member 12 until the end of said member seats against an internal shoulder 13a formed within the member 13 as shown in Fig. 4.

The central portion of the member 12 is provided with a bore 14 that communicates with a counterbore 15 in the enlarged portion 12a of the member, the wall of said counterbore preferably being provided with annular grooves and ribs. An annular flange 16 projects downwardly from the central portion of the member 12 and into the counterbore 15. The member 12 beyond its central portion is provided with an exteriorly threaded nipple 17 that has a threaded bore 18. The bore 14 in the central portion of the member and the threaded bore 18 in the nipple 17 of the member are in communication by a tapered bore 19. The member 12 adjacent the junction between the nipple 17 and the central portion thereof is provided exteriorly with a ferrule shaped portion 20 that embraces the outer end of the rubber stem 10, as will later be referred to.

Figures 4, 5:
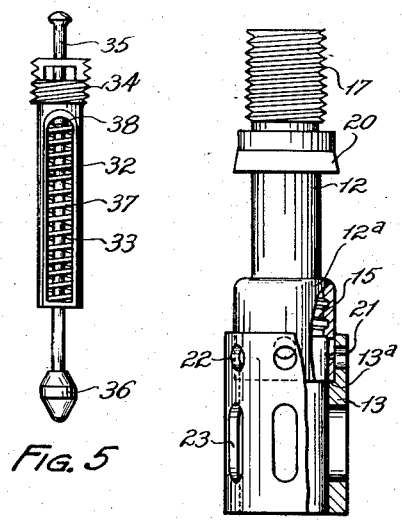
Fig. 4 is an elevational view of the metal valve receiving insert or sleeve with portions thereof broken away and shown in section.
Fig. 5 is an elevational view of the valve mechanism shown in Fig. 2.

The lower end of the enlarged portion 12a of the member 12 is provided with a plurality of circumferentially spaced openings 21 which, when the member 13 is telescoped upon the said end of the member 12, lie in alignment or partial alignment with a similar series of openings 22 formed in the member 13 adjacent its end, as clearly shown in Fig. 4. The member 13 is also provided with a series of circumferentially spaced longitudinally extending slots 23.

The rubber stem 10 is molded on the metal valve receiving insert or sleeve with a portion of the stem located within the metal insert or sleeve below the flange 16 thereof, and said portion is provided with a bore 10a and a bore 10b connected by a restricted passage 10c that terminates at the end of the bore 10b in a tapered seat 24.

It will be seen that when the rubber stem is molded on the valve receiving sleeve or insert the rubber will flow through the openings 21 in the member 12 and the openings 22 and slots 23 in the member 13 and, in effect, mechanically unite the stem to the metal insert, thus forming a secure and permanent connection therebetween, without reliance upon adherence as would be the case were the stem merely vulcanized to the rubber insert. This construction possesses the decided advantage that all danger is obviated of the insert being forced or blown out of the stem due to air pressures in the article to which the stem is attached. Likewise it will be noted that the rubber of the stem fills the grooves in the counterbore 15 of the member 12 and extends between the flange 16 and the wall of the counterbore, thus further providing for a secure connection between the insert and stem.

The fact that the metal valve receiving insert or sleeve is embedded in the rubber stem for a portion of its length, that is, the rubber of the stem is located both exteriorly and interiorly of the insert or sleeve, eliminates the likelihood of air escaping between the insert and stem. The air would have to work around the insert starting from the flange 16 and it will readily be seen that its path would be so long and tortuous that escape by this route would be impossible.

The insert imparts to the rubber stem sufficient strength to assure against the stem "ballooning" or bulging under air pressures.

In order to provide a symmetrical appearance to the stem, the outer end thereof is tapered, as clearly illustrated, and the extreme end of the rubber stem extends between the ferrule 20 and the main portion of the member 12, thus protecting the outer end of the rubber against damage by the valve cap or by the air chucks of air lines.

It will be noted that the mechanical connection between the stem and the insert occurs at the portion of the stem of greatest thickness, wherefore a large amount of rubber forms this mechanical connection and the same thus possesses the requisite strength to securely maintain the insert in position in the stem. Not only does the connection between the insert and the stem adequately provide against the insert being blown from the stem, but, since no reliance is placed upon adherence between the rubber and the metal of the insert, any desired and suitable metal can be used for the insert. In vulcanizing rubber to metal difficulty has been experienced in obtaining the necessary adherence between the metal and the rubber, and the present construction eliminates this difficulty altogether.

In addition to avoiding the necessity of having the rubber of the stem adhere to the metal insert, the present construction possesses the further advantage that other conventional forms of valve insides or cores can be used therein or, if desired, a valve may be used therein which seats against an integral part of the rubber stem acting as a valve seat. Therefore, rubber valve stems embodying the present construction may be said to be susceptible of universal use.

As illustrative of this phase of the invention, reference will first be made to Fig. 1 wherein a valve insides of usual and conventional form is employed with the valve stem. As is well known in the art, this valve insides comprises a threaded plug and bridge portion 25 that is swivelly connected to a barrel 26 having adjacent one of its ends a tapered gasket carrying portion 27 while its opposite end acts as a seat for the valve 28. A valve pin 29 projects through the plug and barrel and has fixed thereto the valve 28 which seats against the lower end of the barrel. Below the valve 28 a valve spring 30 is mounted on the pin and said spring at its lower end abuts an abutment member 31 slidably associated with the valve pin and acts to constantly urge the valve 28 against its seat.

This form of valve insides is well known and reference to Fig. 1 will indicate how the insides is positioned within the valve stem by screwing the plug 25 into the nipple 17 of the insert until the gasket portion 27 of the barrel is brought into a tight fit in the tapered passage 19 in the insert while the abutment member 31 is brought into engagement with the shoulder at the lower end of the bore 10a in the valve stem.

Other types of conventional valve insides or cores such as those wherein the valve spring is mounted above the plug or those wherein the valve spring is housed within the barrel can be just as readily employed in the valve stem of the present construction.

Figure 2:
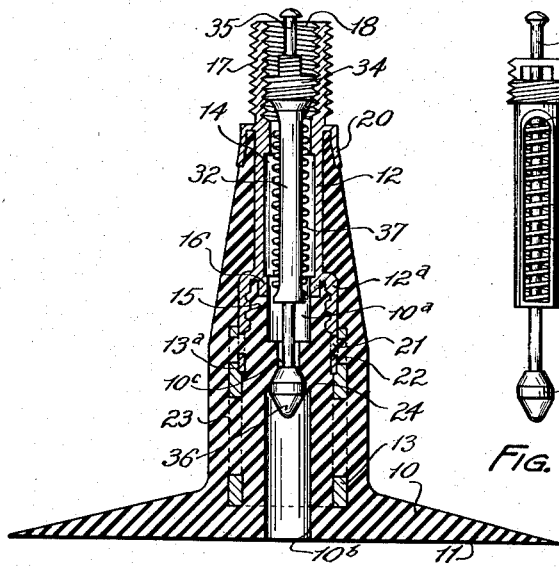
Fig. 2 is a view similar to Fig. 1 but shows a valve mechanism mounted in the metal valve receiving insert or sleeve with the valve thereof seating against an integral part of the stem.

It has been proposed to eliminate the use of valve insides or cores in rubber valve stems and to employ in such stems a valve that seats against an integral part of the stem. The valve stem of the present invention can also be employed with this last mentioned type of valve as reference to Figs. 2 and 5 will clearly show.

The valve in this instance comprises an elongated metal barrel 32 having diametrically opposed slots 33 formed therein, and provided at its outer end with an externally threaded enlarged portion 34 similar to the plug portion 25 in the usual valve insides, previously referred to. The valve pin 35 extends through the barrel 32 as clearly shown in Fig. 5 and is provided at its lower end with a conical valve head 36, a coil spring 37 located within the barrel 32 and acting against an abutment lug 38 on the pin serving to normally urge the pin and valve head in a valve seating direction.

When this form of valve is used in the valve stem of the present construction it is positioned within the insert from the outer end thereof and the threaded portion 34 screwed into the threaded nipple 17 until the lower end of the valve head engages the shoulder at the lower end of the bore 10a in the rubber stem. The valve pin 35 may then be depressed to force the valve head through the restricted passage 10c in the stem, it being understood that the walls of said passage will yield sufficiently to allow the valve head to pass therethrough, after which the portion 34 is screwed further into the nipple 17 until the valve head 36 has passed entirely through the restricted passage 10c. When the valve has thus been positioned, the spring 37 will act to hold the valve head firmly against the tapered seat 24 formed in the valve stem to thus seal against the passage of air through the stem. The valve 36 may be unseated by depressing the valve pin 35 when it is desired to inflate or deflate the article to which the stem is attached.

The last described form of valve can be removed from the stem by unscrewing the portion 34 thereof from the nipple 17 and, of course, when this is done the valve head 36 is forced through the restricted passage 10c in the rubber stem.

It will be understood that although the valve head 36 can be forced through the restricted passage 10c in the stem in order to mount the valve or to remove the same from the stem, nevertheless the thickness of the rubber stem adjacent the tapered seat 24 and also the fact that the metal insert is arranged therein at this point give sufficient rigidity to the tapered seat to withstand in use the pressure of the valve head thereon.

In the event that the tapered seat 24 should become worn, or it should otherwise be undesirable to employ the last described form of valve in the valve stem, then such valve could be removed and one of the usual forms of valve insides employed therewith.

Although a preferred embodiment of the invention has been illustrated and described herein, it should be understood that the invention is susceptible of various modifications and adaptations within the scope of the appended claims.

Having thus described my invention, I claim:

1. A metal valve receiving insert adapted to be molded in the stem portion of a rubber valve stem and comprising two separable tubular portions having telescopic engagement whereby the length of the insert can be varied to enable its use in rubber valve stems of different lengths.

2. A metal valve receiving insert adapted to be molded in the stem portion of a rubber valve stem and comprising two separable tubular portions having telescopic engagement whereby the length of the insert can be varied to enable its use in rubber valve stems of different lengths, each of said tubular portions being provided with openings through which the rubber of the stem in which it is molded can extend.

3. A rubber valve stem comprising a stem portion and a base portion, and a tubular metal insert mounted in the stem portion, the stem for a part of its length lying both exteriorly and interiorly of the insert and having within the insert an integral valve seat, the stem for the remainder of its length lying only exteriorly of the insert, said insert being provided with means for receiving and retaining therein a valve insides or core of the type having a barrel provided at its inner end with a valve seat and a threaded attaching plug which, by means of a swivel, is associated with the outer end of the barrel, a valve pin extending through said plug and barrel and provided with a valve engaging the seat on the inner end of the barrel or for retaining and receiving therein a valve mechanism the valve of which seats against said integral seat in the stem.

4. A rubber valve stem comprising a stem portion having a bore therethrough and provided with an integral rubber valve seat, a metal valve receiving insert in said stem and having an internally threaded portion and a portion inwardly of the threaded portion shaped so as to adapt it to receive a valve insides or core of the type having a barrel shaped to cooperate with said last named portion and provided on its inner end with a valve seat, a threaded attaching plug which, by means of a swivel, is associated with the outer end of said barrel and adapted to be screwed into said internally threaded portion, a valve pin extending through said plug and barrel and provided with a valve engaging the seat on the end of the barrel or for receiving a valve mechanism mounted in said stem and comprising a barrel having an externally threaded portion screwed into the threaded portion of the insert, a valve seating against said integral valve seat, and a valve pin connected to said valve and slidably supported in said barrel.

5. A rubber valve stem comprising a stem portion having a bore therethrough and provided intermediate its ends with an integral rubber valve seat, a tubular metal valve receiving insert secured in said stem portion and having outwardly of said integral valve seat a portion shaped to cooperate with a valve insides or core of the type having a barrel provided at its inner end with a valve seat, a threaded plug which, by means of a swivel, is associated with the outer end of the barrel and a valve pin extending through said barrel and plug and provided with a valve engaging the seat on the inner end of the barrel and inwardly of said portion which receives a valve insides and an internally threaded portion whereby said valve insides or core can be retained in said insert or a valve mechanism can be retained therein, the valve of which seats against said integral seat.

6. A rubber valve stem comprising a stem portion having a bore therethrough, a metal valve receiving insert extending into said bore from the outer end of said stem, means providing a valve seat intermediate the ends of the said stem, said insert having an internally threaded portion and a portion inwardly of the threaded portion shaped so as to receive a valve insides or core of the type having a barrel adapted to cooperate with said last named portion and provided on its inner end with a valve seat, a threaded plug which, by means of a swivel, is associated with the outer end of said barrel and adapted to be screwed into said internally threaded portion, a valve pin extending through said plug and barrel and provided with a valve engaging the seat on the end of the barrel or for receiving a valve mechanism mounted in said stem and comprising a barrel having an externally threaded portion screwed into the threaded portion of the insert, a valve seated against the valve seat formed intermediate the ends of the bore in the valve stem, and a valve pin connected to said valve and extending through said barrel.

7. A valve stem comprising a rubber body portion provided with a longitudinal passage extending from base to tip, said passage being constricted intermediate its ends to form a shoulder of the body material facing toward the tip of the stem; and a rigid tubular insert mounted in the stem, the rubber of said body portion lying both exteriorly and interiorly of said insert for a portion of the length of said insert adjacent the inner end thereof, said insert having an internally threaded portion and a portion inwardly of the threaded portion adapted to receive a valve insides or core of the type having a barrel shaped to cooperate with said last-named portion and provided on its inner end with a valve seat, and having a threaded attaching plug which by means of a swivel is associated with the outer end of said barrel and adapted to be screwed into said internally threaded portion, a valve pin extending through said plug and barrel provided with a valve engaging the seat on the inner end of the barrel, and a spring seating against the said shoulder of body material for normally urging said valve against said valve seat.

8. A valve stem comprising a rubber body portion provided with a longitudinal passage extending from base to tip, said passage being formed with a constriction intermediate its ends forming a shoulder of the body material facing toward the tip of the stem and another shoulder facing toward the base of the stem; and a rigid tubular insert mounted in the tip of the stem, the rubber of said body portion lying both exteriorly and interiorly of said insert for a portion of the length of said insert adjacent the inner end thereof, said insert being provided with means for receiving and retaining therein a valve insides or core of the type having a barrel provided at its inner end with a valve seat, and having a threaded attaching plug which by means of a swivel is associated with the outer end of the barrel, a valve pin extending through said plug and barrel provided with a valve engaging a seat on the inner end of the barrel, and a spring seating against said rubber shoulder facing the tip of the stem for normally urging said valve against said seat, or for retaining and receiving therein a valve mechanism, the valve of which seats against the integral rubber shoulder facing the base of said stem.

9. A valve stem as defined in claim 3, in which the embedded portion of the tubular metal insert extends from above to below the valve seat and substantially to the base.

10. A valve stem as defined in claim 3, in which the interior of the tubular metal insert is provided with projections to interlock with the rubber of the body to form a seal against the escape of air therebetween.

11. A valve stem as defined in claim 7, in which the interior of the insert engaging the interiorly positioned portion of the rubber of the body is provided with horizontally extending ribs, said ribs being interlocked with the body portion to form a seal against the escaping of air therebetween.

OAKLEY W. HOSKING.